No. 745,223. Patented November 24, 1903.

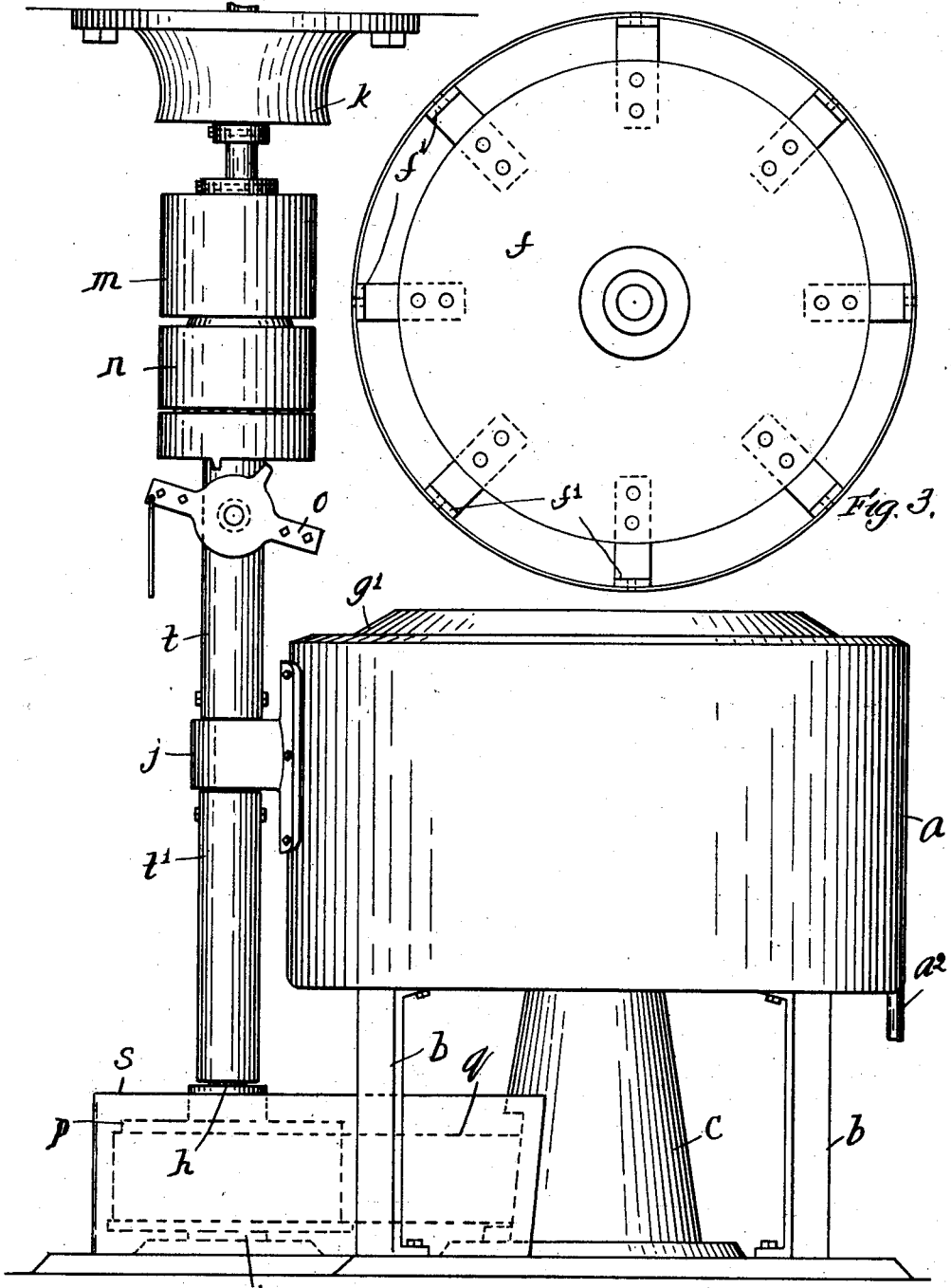

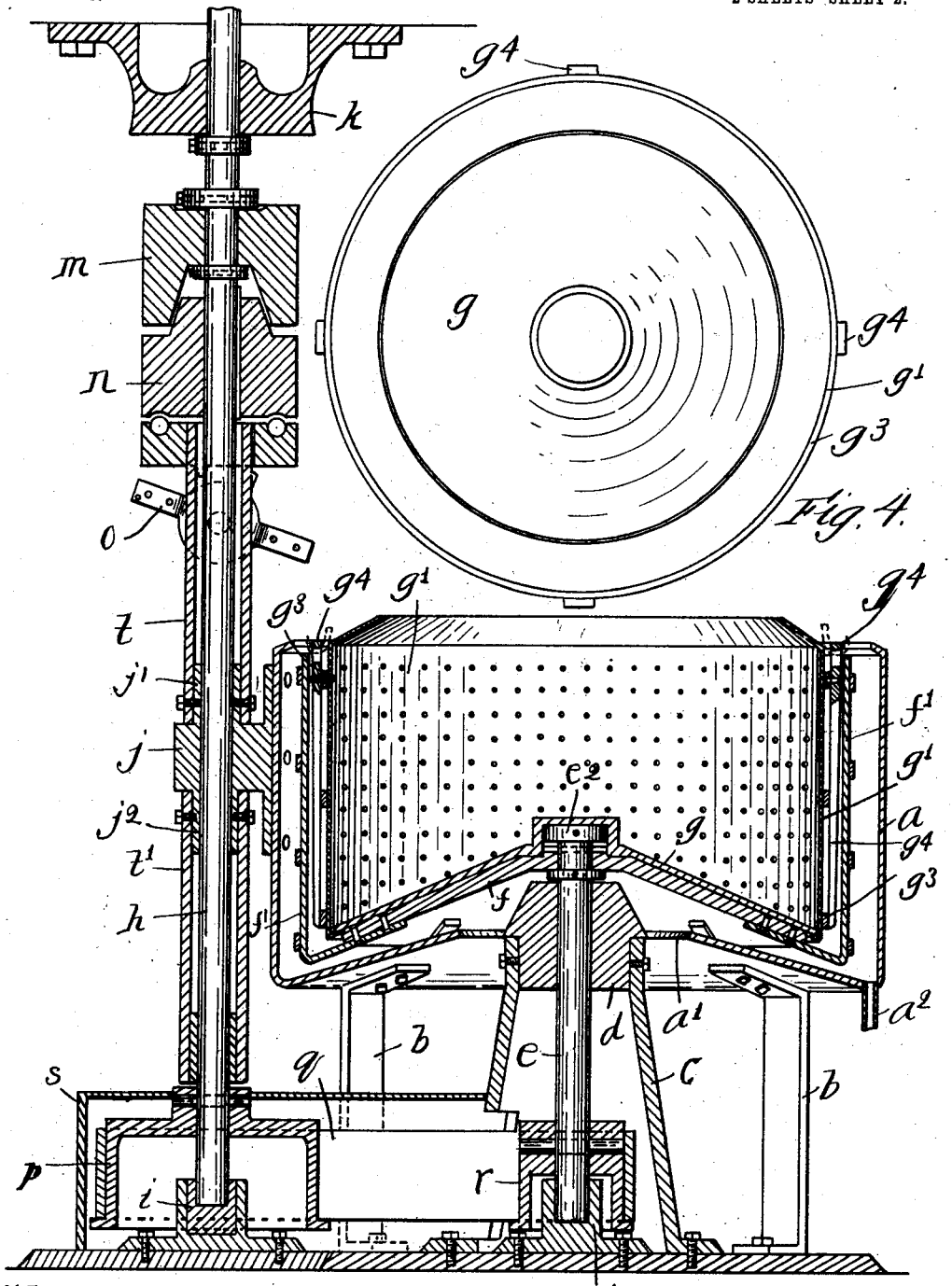

UNITED STATES PATENT OFFICE.

HENRY MONK, OF CAMBRIDGE, MASSACHUSETTS.

CENTRIFUGAL DRIER.

SPECIFICATION forming part of Letters Patent No. 745,223, dated November 24, 1903.

Application filed March 14, 1903. Serial No. 147,714. (No model.)

*To all whom it may concern:*

Be it known that I, HENRY MONK, of Cambridge, county of Essex, State of Massachusetts, have invented an Improvement in Centrifugal Extractors, of which the following description, in connection with the accompanying drawings, is a specification, like characters on the drawings representing like parts.

This invention relates to certain improvements in that class of centrifugal extractors which are employed in laundries to extract water from clothes.

So far as I am aware, in operating the centrifugal extractors now in general use in laundries it is necessary to throw the clothes to be dried into a machine a few pieces at a time and then arrange them as evenly as possible before starting it again and to remove them in like manner. In this way considerable time is consumed, during which the machine must be idle.

The object of my invention is to facilitate the loading and unloading of such extractors, so that more clothes may be dried with a single machine in a given time than with the class of machines above referred to.

A further object of my invention is to provide improved means for transmitting the power from the overhead counter-shaft to an extractor of the character above referred to, as hereinafter explained.

In the drawings, Figure 1 is a side elevation of a centrifugal extractor provided with my improvements. Fig. 2 is a vertical central section thereof. Figs. 3 and 4 are plan views of the holder and basket, respectively.

The centrifugal extractor is provided with the usual circular outer casing $a$, which is rigidly supported by legs $b$, said casing having its bottom dished and provided with a central circular opening $a'$. A discharge-pipe $a^2$ leads from the lowest point in the bottom. A hollow frusto-conical-shaped standard $c$, having a bearing $d$ secured in its upper end, is arranged concentric with said casing, and a vertical shaft $e$ is journaled in said bearing, its lower end being stepped in a bearing $e'$. A circular carrier $f$ is centrally secured to the upper end of the shaft $e$. Said carrier has a solid conical-shaped bottom, and a series of vertical arms $f'$ extend upward from the edge thereof.

A circular basket having a solid bottom $g$ of the same shape as the bottom of the carrier $f$ and vertical perforated sides $g'$ is arranged removably within the carrier, with its bottom resting on the bottom thereof. The upper end of the shaft $e$ extends through the bottom of the carrier and is provided with a cylindrical centering-head $e^2$, and the under side of the bottom of the basket is provided with a centrally-arranged recess into which said head $e^2$ snugly fits, so that when the basket is placed in the carrier it will be perfectly centered. The basket is provided with a series of circumferential strengthening-hoops $g^3$ and longitudinal ribs $g^4$, and the upper end of its sides are bent inwardly. Two baskets are provided for each machine.

The means which I employ for rotating shaft $e$ of the carrier comprises a vertical shaft $h$, which is stepped and journaled in the bearing $i$ and journaled in a bearing $j$, secured to the casing $a$, and a bearing $k$, secured to the ceiling. A loose pulley $m$ is arranged on the upper end of shaft $h$, said pulley being driven by any suitable arrangement of belting from the counter-shaft. Said pulley comprises one member of a clutch, the other member $n$ being splined on the shaft $h$. A lever $o$ may be employed to force the clutch members together. A pulley $p$ is secured to the lower end of shaft $h$, and a belt $q$ passes about the same and a pulley $r$ on shaft $e$. The standard $c$ is provided with an opening to permit the passage of the belt, and the belt and pulley $p$ are inclosed by a suitable housing $s$. The bearing $j$ is provided with upper and lower extensions $j'$ $j^2$, and tubular housings $t$ $t'$ are respectively secured to said extensions and completely inclose shaft $h$ both above and below the bearing $j$. The driving means for the extractor is thus completely inclosed, so that it is impossible for the operator to become injured thereby or entangled therein. This driving means also occupies a minimum amount of space.

In operating the machine the basket, which has been previously removed, is filled with wet clothes, and then it is lifted by a conveniently-arranged derrick or other suitable means and lowered into the carrier. Suitable attaching means, which may be readily detached, as hooks, (see dotted lines, Fig. 2,)

may be employed. The carrier is then rotated, carrying the basket with it, and the water is extracted from the clothes by centrifugal force in the usual manner. When the water has been extracted, the basket is lifted from the carrier, and another basket, which has been in the meantime filled with wet clothes, is placed therein. In this way but little time is lost in transferring the clothes, with the result that a less number of machines are required to do the same work than if the basket could not be removed.

By providing the centering-head on the carrier-shaft e, which enters the centering-recess of the basket, the latter will be held in a perfectly central position while it is being rotated, so that there will be as little vibration as possible.

By providing the frustum-shaped standard e with the bearing in its upper end closely adjacent the bottom of the carrier the carrier-shaft will be held as rigidly as possible from vibration when it is rotated.

Having thus described my invention, what I claim as new, and desire to secure by Letters Patent, is—

1. A centrifugal extractor comprising the stationary outer casing, a circular carrier open at its upper end, a vertical rotatable shaft on which said carrier is centrally mounted, and a circular perforated basket arranged within said carrier and removable therefrom in a vertical direction, substantially as described.

2. A centrifugal extractor comprising the stationary outer casing, a circular carrier open at its upper end, a vertical rotatable shaft on which said carrier is centrally mounted, said shaft extending through and above the bottom of the carrier, and a circular perforated basket insertible at the upper end of the carrier, said basket having a centering-recess in the middle of its bottom in which the upper end of said shaft is fitted and located, substantially as described.

3. In a centrifugal extractor, the fixed outer casing having the circular basket, a vertical shaft on which said basket is mounted, a hollow frusto-conical-shaped standard surrounding said shaft having a bearing in its upper end adjacent the bottom of the basket, a bearing for the lower end of said shaft and means for rotating said shaft, substantially as described.

4. In combination with a centrifugal extractor, having a vertical shaft bearing a basket at its upper end, a rigid stationary casing surrounding said basket, a vertical driving-shaft arranged adjacent said casing, a vertically-arranged bearing secured to one side of said casing in which said driving-shaft is journaled, a bearing for the lower ends of both of said shafts, and a driving-gear between the lower end portions of said shafts, substantially as described.

In testimony whereof I have signed my name to this specification in the presence of two subscribing witnesses.

HENRY MONK.

Witnesses:
 LOUIS H. HARRIMAN,
 H. B. DAVIS.